(12) United States Patent
Wu

(10) Patent No.: US 9,781,544 B2
(45) Date of Patent: Oct. 3, 2017

(54) MACHINE TYPE COMMUNICATION (MTC) DEVICES, SERVICE NETWORKS, AND METHODS FOR CONFIGURING PERIODIC UPDATE TIMERS THEREOF

(71) Applicant: Acer Incorporated, New Taipei (TW)

(72) Inventor: Chien-Cheng Wu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 79 days.

(21) Appl. No.: 14/750,131

(22) Filed: Jun. 25, 2015

(65) Prior Publication Data

US 2016/0234627 A1    Aug. 11, 2016

(30) Foreign Application Priority Data

Feb. 9, 2015  (TW) .............................. 104104198 A

(51) Int. Cl.
*H04W 4/00* (2009.01)
*H04W 80/02* (2009.01)
(Continued)

(52) U.S. Cl.
CPC .............. *H04W 4/005* (2013.01); *H04B 1/40* (2013.01); *H04L 5/0055* (2013.01);
(Continued)

(58) Field of Classification Search
CPC ... H04W 4/005; H04W 60/02; H04W 64/003; H04W 68/00; H04W 68/005;
(Continued)

(56) References Cited

U.S. PATENT DOCUMENTS 8,773,988 B2   7/2014 Tiwari
9,049,538 B2   6/2015 Lee et al.
(Continued)

FOREIGN PATENT DOCUMENTS

CN   102300331   12/2011
CN   102548008   7/2012
(Continued)

OTHER PUBLICATIONS

Taiwanese language office action dated May 19, 2016, issued in application No. TW 104104198.
(Continued)

*Primary Examiner* — Luat Phung
*Assistant Examiner* — Saad A Waqas
(74) *Attorney, Agent, or Firm* — McClure, Qualey & Rodack, LLP

(57) ABSTRACT

A Machine Type Communication (MTC) device including a wireless transceiver and a controller is provided. The wireless transceiver performs wireless transmission and reception to and from a service network. The controller receives a paging message including a timer update flag from the service network via the wireless transceiver, transmits a Service Request message to the service network via the wireless transceiver in response to the paging message including the timer update flag, and receives a downlink (DL) Information Transfer message including a value for a periodic update timer from the service network via the wireless transceiver.

12 Claims, 5 Drawing Sheets

(51) Int. Cl.
*H04W 68/00* (2009.01)
*H04B 1/40* (2015.01)
*H04L 5/00* (2006.01)
*H04W 64/00* (2009.01)
*H04W 72/04* (2009.01)
*H04W 84/04* (2009.01)

(52) U.S. Cl.
CPC ......... *H04W 64/003* (2013.01); *H04W 68/00* (2013.01); *H04W 68/005* (2013.01); *H04W 72/042* (2013.01); *H04W 80/02* (2013.01); *H04W 84/04* (2013.01)

(58) Field of Classification Search
CPC .. H04W 72/042; H04W 84/04; H04L 5/0055; H04B 1/40
See application file for complete search history.

(56) References Cited

U.S. PATENT DOCUMENTS

| | | | | |
|---|---|---|---|---|
| 2012/0149383 A1* | 6/2012 | Wang | ................... | H04W 68/02 455/450 |
| 2012/0157093 A1* | 6/2012 | Zhu | ................... | H04W 60/00 455/433 |
| 2013/0183969 A1* | 7/2013 | Kang | ................... | H04W 60/00 455/435.1 |
| 2014/0233538 A1 | 8/2014 | Zhang et al. | | |
| 2016/0302153 A1* | 10/2016 | Martin | ................... | H04W 52/0222 |

FOREIGN PATENT DOCUMENTS

| | | |
|---|---|---|
| CN | 102724650 | 10/2012 |
| CN | 103200517 | 7/2013 |
| CN | 102215524 | 6/2014 |
| CN | 104053144 | 9/2014 |
| EP | 2 515 561 | 10/2012 |
| EP | 2 713 666 | 4/2014 |
| WO | WO 2012/137033 | 10/2012 |

OTHER PUBLICATIONS

European Search Report dated Jun. 21, 2016, issued in application No. 15181810.1-1505.

"3rd Generation Partnership Project; Technical Specification Group Services and System Aspects; System Improvements for Machine-Type Communications (Release 11);" Aug. 2011; pp. 1-139.

* cited by examiner

MACHINE TYPE COMMUNICATION (MTC) DEVICES, SERVICE NETWORKS, AND METHODS FOR CONFIGURING PERIODIC UPDATE TIMERS THEREOF

CROSS REFERENCE TO RELATED APPLICATIONS

This application claims priority of Taiwan Patent Application No. 104104198, filed on Feb. 9, 2015, the entirety of which is incorporated by reference herein.

BACKGROUND OF THE INVENTION

Field of the Invention

The invention generally relates to configurations of periodic update timers, and more particularly, to a method to configure periodic update timers for Machine Type Communication (MTC) devices.

Description of the Related Art

For a long time, various machines have been provided to make our lives more convenient in every way. Nowadays, machines are generally equipped with computing processors and software to accommodate us with more intelligence-based services. With the advancement of wireless communications, Machine Type Communication (MTC) technology has been developed to enable wireless communications between remote machines for exchanging information and operating without human interaction. Especially for critical public infrastructure, such as water treatment facilities or bridges, MTC sensors may be employed to monitor the operation statuses of facilities and to report measurement results back to control centers via a wireless communication technology, such as the Global System for Mobile communications (GSM) technology, General Packet Radio Service (GPRS) technology, Enhanced Data rates for Global Evolution (EDGE) technology, Wideband Code Division Multiple Access (WCDMA) technology, High Speed Packet Access (HSPA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, Time-Division LTE (TD-LTE) technology, etc.

According to the 3rd Generation Partnership Project (3GPP) Technical Specification (TS) 23.887, v12.0.0, a service network may configure low-mobility and/or low-power MTC devices to deactivate their periodic update timers for saving power. The periodic update timers include the periodic Location Update (LU) timer T3212, the periodic Routing Area Update (RAU) timer T3312, and the periodic Tracking Area Update (TAU) timer T3412.

According to the 3GPP TS 24.008, v12.0.0 and TS24.304, v12.0.0, a service network may assign new values for the periodic update timers to MTC devices through system information broadcasts or LU procedures. However, if certain MTC devices were configured by the service network to deactivate the periodic LU timer T3212 through previously performed LU procedures (by assigning a zero value for the periodic LU timer T3212), those MTC devices will deliberately ignore any new values of the periodic LU timer T3212 contained in later system information broadcasts. As a result, when the service network detects that certain MTC devices haven't performed LU procedures over a period of time, it cannot identify whether the MTC devices are malfunctioning or whether they have applied the zero value for the periodic LU timer T3212. That is, in the conventional design, in-synchronization between the service network and the MTC devices may occur regarding the values in use for the periodic LU timer T3212.

In addition, according to the 3GPP TS 24.008, v12.0.0 and TS24.304, v12.0.0, if the user or the service network wishes to reactivate the periodic LU timer T3212, the periodic RAU timer T3312, or the periodic TAU timer T3412 in the MTC devices, the MTC devices will be required to detach from the service network first, and then re-attach to the service network to obtain a new value for reactivating the periodic LU timer T3212, the periodic RAU timer T3312, or the periodic TAU timer T3412. However, the detachment and re-attachment processes involve a great number of signaling messages to be exchanged between the MTC devices and the service network, which inevitably causes serious interruptions to the ongoing wireless communications therebetween.

BRIEF SUMMARY OF THE INVENTION

In order to solve the aforementioned problem, the invention proposes a method to configure periodic update timers for MTC devices. The method not only enables the service network to stay in-sync with the MTC devices with respect to the values in use for the periodic LU timer T3212, but also reduces the number of signaling messages exchanged between the MTC devices and the service network without interrupting the ongoing wireless communications therebetween when it comes to reactivating the periodic LU timer T3212, the periodic RAU timer T3312, or the periodic TAU timer T3412.

In the first aspect of the invention, an MTC device is provided. The MTC device comprises a wireless transceiver and a controller. The wireless transceiver is configured to perform wireless transmission and reception to and from a service network. The controller is configured to receive a paging message comprising a timer update flag from the service network via the wireless transceiver, transmit a Service Request message to the service network via the wireless transceiver in response to the paging message comprising the timer update flag, and receive a downlink (DL) Information Transfer message comprising a value for a periodic update timer from the service network via the wireless transceiver.

In the second aspect of the invention, a method for an MTC device to configure a periodic update timer is provided. The method comprises the steps of: receiving a paging message comprising a timer update flag from a service network; transmitting a Service Request message to the service network in response to the paging message comprising the timer update flag; and receiving a DL Information Transfer message comprising a value for a periodic update timer from the service network.

In the third aspect of the invention, a service network is provided. The service network comprises an access network and a core network. The access network comprises at least one base station for performing wireless transmission and reception to and from an MTC device. The core network is configured to transmit a paging message comprising a timer update flag to the MTC device via the access network, receive a Service Request message from the MTC device via the access network, and transmit a DL Information Transfer message comprising a value for a periodic update timer to the MTC device via the access network in response to the Service Request message.

In the fourth aspect of the invention, a method for a service network to configure a periodic update timer is provided. The method comprises the steps of: transmitting a paging message comprising a timer update flag to an MTC device; receiving a Service Request message from the MTC device; and transmitting a DL Information Transfer message comprising a value for a periodic update timer to the MTC device in response to the Service Request message.

Other aspects and features of the invention will become apparent to those with ordinary skill in the art upon review of the following descriptions of specific embodiments of the MTC devices, the service networks, and the methods for configuring a periodic update timer thereof.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
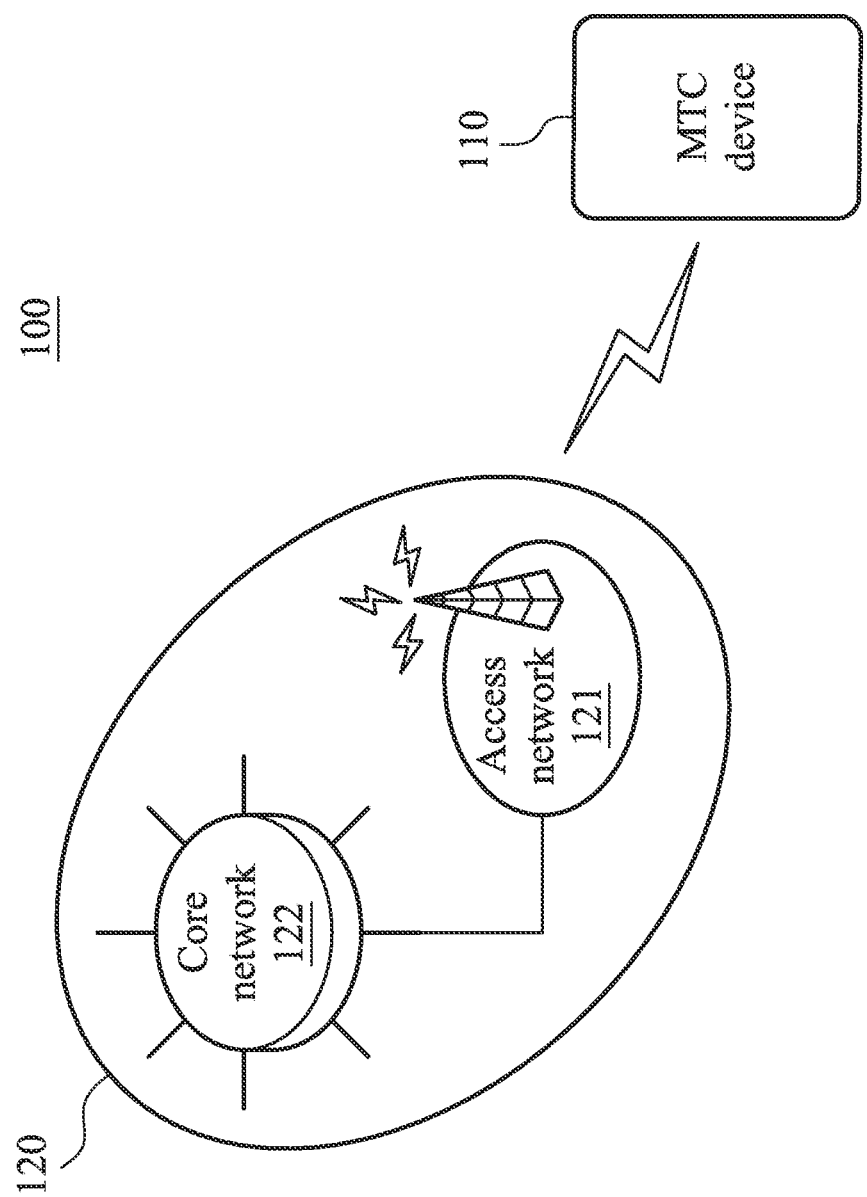
FIG. 1 is a block diagram of a wireless communication environment according to an embodiment of the invention.

FIG. 1 is a block diagram of a wireless communication environment according to an embodiment of the invention. The wireless communication environment 100 comprises an MTC device 110 and a service network 120, wherein the MTC device 110 is wirelessly connected to the service network 120 for obtaining mobile services. The MTC device 110 may be any computing device supporting the wireless technology utilized by the service network 120. For example, the MTC device 110 may include one or more sensors for monitoring specific statistics and reporting the monitored result to a control center via the service network 120. The service network 120 may be a GSM system, a GPRS system, an EDGE system, a WCDMA system, a CDMA-2000 system, a TD-SCDMA system, a WiMAX system, an LTE system, an LTE-A system, a TD-LTE system, or another, depending on the wireless technology in use.

Specifically, the service network 120 comprises an access network 121 and a core network 122, wherein the access network 121 is responsible for processing radio signals, terminating radio protocols, and connecting the MTC device 110 with the core network 122, while the core network 122 is responsible for performing mobility management, network-side authentication, and interfaces with public/external networks (e.g., the Internet). The access network 121 at least comprises a base station for providing the function of wireless transmission and reception. Alternatively, the access network 121 may further comprise a base station controller for controlling the operation of the base station, or the base station controller may be incorporated into the base station.

For example, if the service network 120 is a GSM/GPRS/EDGE system, the access network 121 may be a Base Station Subsystem (BSS) which includes at least a Base Transceiver Station (BTS) and a Base Station Controller (BSC), and the core network 122 may be a GPRS core which includes a Home Location Register (HLR), at least one Visitor Location Register (VLR), at least one Serving GPRS Support Node (SGSN), and at least one Gateway GPRS Support Node (GGSN).

Alternatively, if the service network 120 is a WCDMA system, the access network 121 may be a Universal Terrestrial Radio Access Network (UTRAN) which includes at least a Node B (NB) and a Radio Network Controller (RNC), and the core network 122 may be a GPRS core.

Alternatively, if the service network 120 is an LTE/LTE-A/TD-LTE system, the access network 121 may be an Evolved-UTRAN (E-UTRAN) which includes at least an evolved NB (eNB) (e.g., a home eNB, macro BS, or pico BS), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 2:
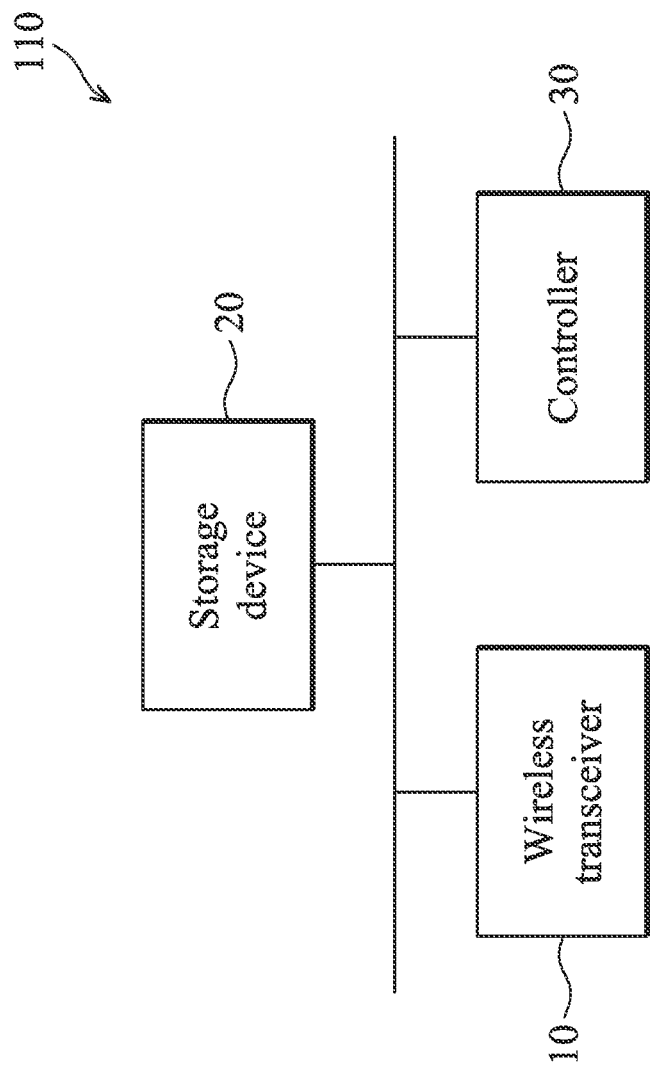
FIG. 2 is a block diagram illustrating the MTC device 110 according to an embodiment of the invention.

FIG. 2 is a block diagram illustrating the MTC device 110 according to an embodiment of the invention. The MTC device 110 comprises a wireless transceiver 10, a storage device 20, and a controller 30. The wireless transceiver 10 is responsible for providing the function of wireless transmission and reception to and from the service network 120. For example, the wireless transceiver 10 may comprise an antenna, a Radio Frequency (RF) unit, and a baseband unit. The baseband unit performs baseband signal processing, including Analog-to-Digital Conversion (ADC)/Digital-to-Analog Conversion (DAC), gain adjusting, modulation/demodulation, encoding/decoding, and so on. The RF unit receives RF wireless signals via the antenna, converts the received RF wireless signals to baseband signals, which are processed by the baseband unit, or receives baseband signals from the baseband unit and converts the received baseband signals to RF wireless signals, which are later transmitted via the antenna. The operative radio frequency may be 900 MHz, 1800 MHz, or 1900 MHz utilized in the GPRS/GPRS/EDGE technology, or 900 MHz, 1900 MHz, or 2100 MHz utilized in WCDMA technology, or 900 MHz, 2100 MHz, or 2.6 GHz utilized in LTE/LTE-A/TD-LTE technology, or other radio frequencies depending on the wireless technology in use.

The storage device 20 may be a memory (e.g., Random Access Memory (RAM), Flash memory, or Non-Volatile Random Access Memory (NVRAM), etc.), a magnetic storage device (e.g., magnetic tape or hard disk), an optical storage device (e.g., Compact Disc Read-Only Memory (CD-ROM)), or any combination thereof for storing instructions and/or program codes of applications and/or communication protocols, and storing the value in use for the periodic update timers.

The controller 30 may be a general-purpose processor, a Micro-Control Unit (MCU), an application processor, a Digital Signal Processor (DSP), or the like, which provides the function of data processing and computing, and controls the operation of the wireless transceiver 10, and loads and executes a series of instructions and/or program codes from the storage device 20 to perform the method for configuring periodic update timers. In another embodiment, the controller 30 may be an MCU or a baseband chip incorporated in the wireless transceiver 10.

Although not shown, the MTC device 110 may further comprise other functional units, such as a display device (e.g., a Liquid Crystal Display (LCD), Light-Emitting Diode (LED) display, or Electronic Paper Display (EPD), etc.) for providing display function, an Input/Output (I/O) device (e.g., button, keyboard, mouse, touch pad, etc.), a sensor for detecting vibration, smoke, water level, or gas leak, etc., a power supply, and a Global Positioning System (GPS) unit for obtaining location information, etc., but the invention is not limited thereto.

Figure 3:
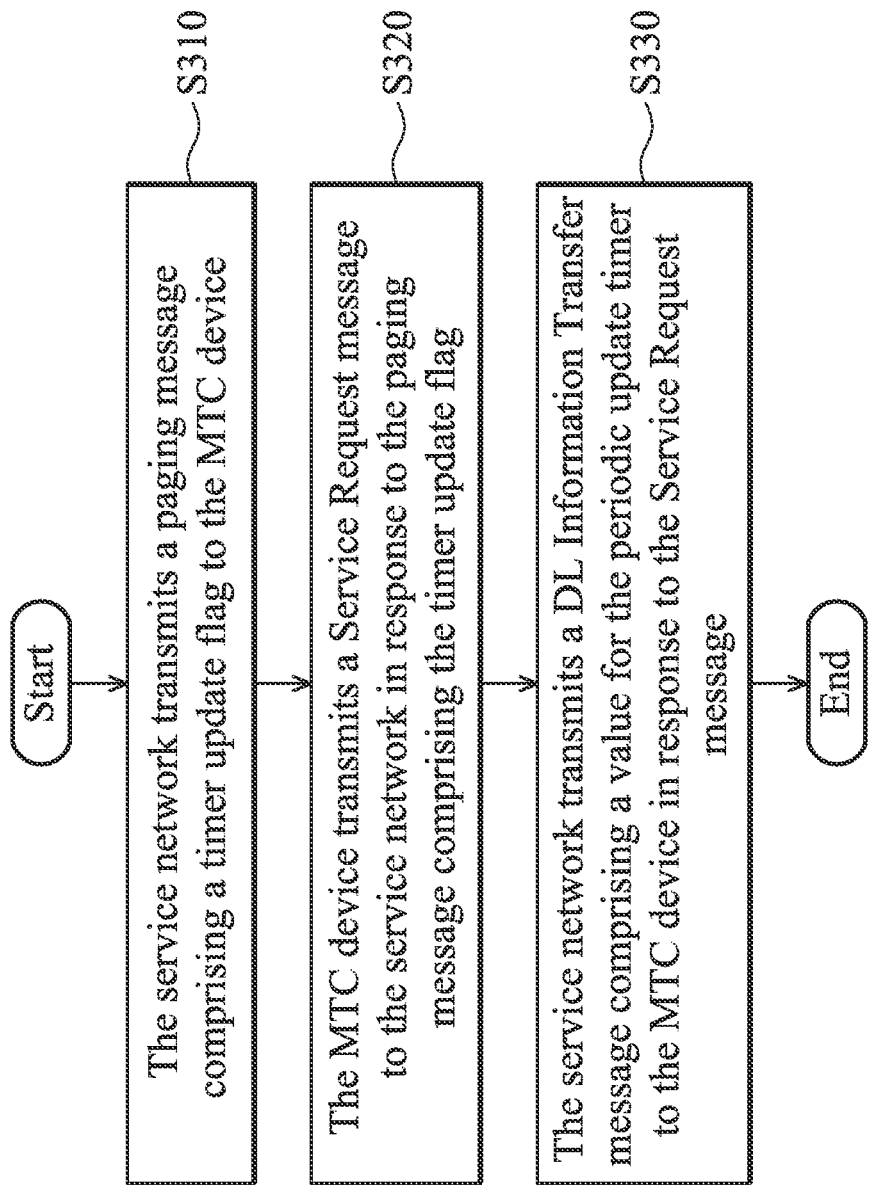
FIG. 3 is a flow chart illustrating the method for configuring a periodic update timer between an MTC device and a service network according to an embodiment of the invention.

FIG. 3 is a flow chart illustrating the method for configuring a periodic update timer between an MTC device and a service network according to an embodiment of the invention. In this embodiment, the method for configuring a periodic update timer applies to both the MTC device and the service network. To begin, the service network transmits a paging message comprising a timer update flag to the MTC device, when it needs the MTC device to report the value in use for the periodic LU timer T3212 or when it needs to reactivate the deactivated periodic LU timer T3212, periodic TAU timer T3312, or periodic RAU timer T3412 in the MTC device (step S310).

Unlike conventional paging messages, the paging message of the invention includes a newly defined Information Element (IE) for storing the timer update flag. Specifically, the timer update flag may be a Boolean value, and if it is set to TRUE, then the MTC device is required to report the value in use for the periodic update timer or to reactivate the periodic update timer, and if it is set to FALSE, then the MTC device is not required to report the value or reactivate the periodic update timer.

Subsequently, the MTC device transmits a Service Request message to the service network in response to the paging message comprising the timer update flag (step S320). After that, the service network transmits a downlink (DL) Information Transfer message comprising a value for the periodic update timer to the MTC device in response to the Service Request message (step S330).

In one embodiment, when the value is positive and is for the periodic LU timer T3212 (e.g., in cases where the service network is a GSM system), the MTC device reactivates the periodic LU timer T3212. When the value is positive and is for the periodic RAU timer T3312 (e.g., in cases where the service network is a GPRS/EDGE/WCDMA system), the MTC device reactivates the periodic RAU timer T3312. When the value is positive and is for the periodic TAU timer T3412 (e.g., in cases where the service network is an LTE/LTE-A/TD-LTE system), the MTC device reactivates the periodic TAU timer T3412. After reactivating the periodic update timer, the MTC device may also transmit an uplink (UL) Information Transfer message comprising an acknowledgement (ACK) to the service network, to confirm receipt of the DL Information Transfer message.

In another embodiment, when the value is negative, it is implied that the service network is a GSM/GPRS/EDGE/WCDMA system and the MTC device may report the value in use for the periodic LU timer T3212 to the service network. Specifically, the MTC device transmits an UL Information Transfer message comprising the value in use for the periodic LU timer to the service network.

Figure 4:
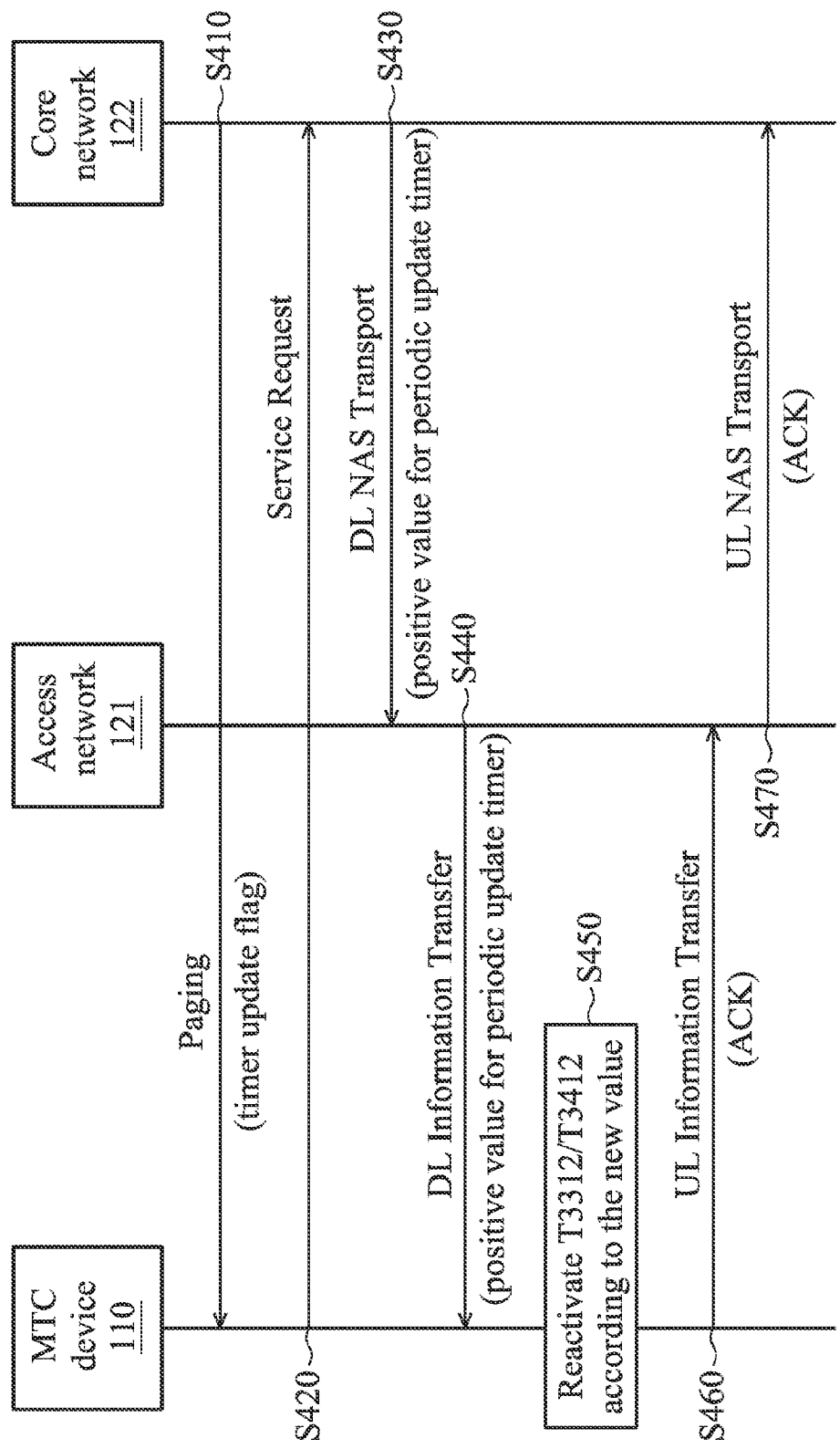
FIG. 4 is a message sequence chart illustrating the reactivation of a periodic update timer according to an embodiment of the invention.

FIG. 4 is a message sequence chart illustrating the reactivation of a periodic update timer according to an embodiment of the invention. In this embodiment, the periodic LU timer T3212, the periodic RAU timer T3312, or the periodic TAU timer T3412 in the MTC device 110 is initially deactivated. Next, when the service network 120 needs to reactivate the deactivated periodic LU timer T3212, periodic TAU timer T3312, or periodic RAU timer T3412 in the MTC device 110, the core network 122 transmits a paging message comprising a timer update flag to the MTC device 110 via the access network 121 (step S410). When receiving the paging message, the MTC device 110 determines whether a timer update flag is included in the paging message, and if so, it transmits a Service Request message to the core network 122 via the access network 121 (step S420).

When receiving the Service Request message, the core network 122 includes a new value (i.e., a positive value) of the periodic update timer in a DL NAS (Non-Access Stratum) Transport message and transmits the DL NAS Transport message to the access network 121 (step S430). Subsequently, the access network 121 transmits the new value for the periodic update timer to the MTC device 110 through a DL Information Transfer message (step S440). Unlike conventional DL NAS Transport messages and DL Information Transfer messages, the DL NAS Transport message and DL Information Transfer message of the invention each includes a newly defined IE for storing the new value for the periodic update timer.

When receiving the DL Information Transfer message, the MTC device 110 reactivates the periodic LU timer T3212, the periodic RAU timer T3312, or the periodic TAU timer T3412 according to the new value included in the DL Information Transfer message (step S450), and then transmits an UL Information Transfer message comprising an ACK to the access network 121, to confirm receipt of the DL Information Transfer message (step S460). After that, the access network 121 forwards the ACK to the core network 122 by transmitting an UL NAS Transport message to the core network 122 (step S470). Unlike conventional UL NAS Transport messages and UL Information Transfer messages, the UL NAS Transport message and UL Information Transfer message of the invention each includes a newly defined IE for storing the ACK.

Please note that, when compared to conventional designs, the reactivation of the periodic LU timer T3212, the periodic RAU timer T3312, or the periodic TAU timer T3412 as shown in FIG. 4 advantageously reduces the number of signaling messages exchanged between the MTC device 110 and the service network 120 without interrupting the ongoing wireless communications therebetween.

Figure 5:
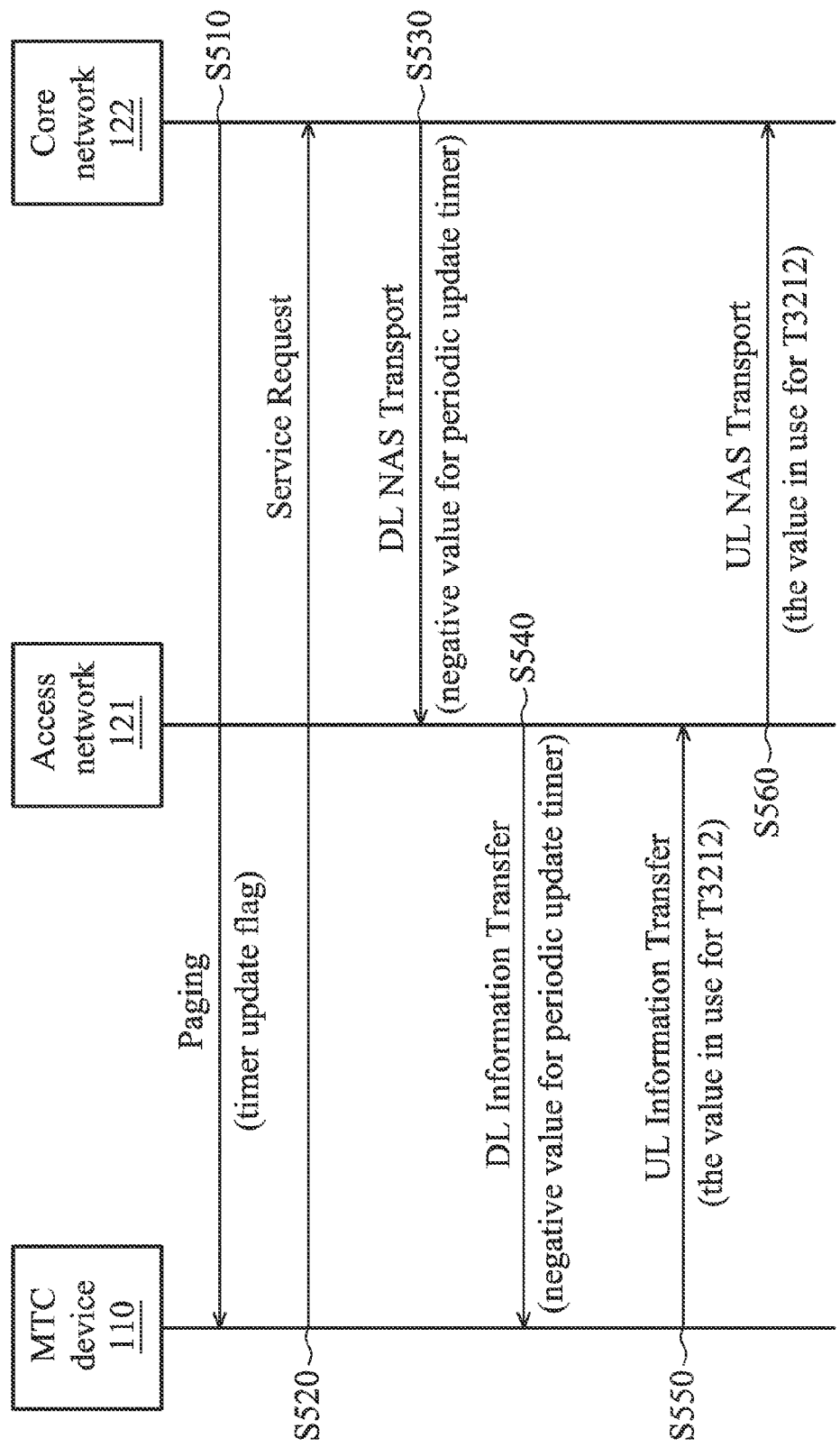
FIG. 5 is a message sequence chart illustrating the synchronization of a periodic update timer according to an embodiment of the invention.

FIG. 5 is a message sequence chart illustrating the synchronization of a periodic update timer according to an embodiment of the invention. To begin, when the service network 120 needs the MTC device 110 to report the value in use for the periodic LU timer T3212, the core network 122 transmits a paging message comprising a timer update flag to the MTC device 110 via the access network 121 (step S510). When receiving the paging message, the MTC device 110 determines whether a timer update flag is included in the paging message, and if so, it transmits a Service Request message to the core network 122 via the access network 121 (step S520).

When receiving the Service Request message, the core network 122 includes a negative value for the periodic update timer in a DL NAS Transport message and transmits the DL NAS Transport message to the access network 121 (step S530). Subsequently, the access network 121 transmits the negative value for the periodic update timer to the MTC device 110 through a DL Information Transfer message (step S540). Similar to the embodiment of FIG. 4, the DL NAS Transport message and DL Information Transfer message each includes a newly defined IE for storing the negative value for the periodic update timer. The negative value indicates the MTC device 110 to report the value for the periodic LU timer T3212, instead of reactivating any periodic update timer.

When receiving the DL Information Transfer message, the MTC device 110 transmits an UL Information Transfer message comprising the value in use for the periodic LU timer T3212 to the access network 121 in response to the negative value included in the DL Information Transfer message (step S550). After that, the access network 121 forwards the value in use for the periodic LU timer T3212 to the core network 122 by transmitting an UL NAS Transport message to the core network 122 (step S560). Unlike conventional UL NAS Transport messages and UL Information Transfer messages, the UL NAS Transport message and UL Information Transfer message of the invention each includes a newly defined IE for storing the value in use for the periodic LU timer T3212.

Please note that, when compared to conventional designs, the synchronization of the periodic LU timer T3212 as shown in FIG. 5 advantageously enables the service network 120 to stay in-sync with the MTC device 110 with respect to the value in use for the periodic LU timer T3212.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A Machine Type Communication (MTC) device, comprising:
    a wireless transceiver, performing wireless transmission and reception to and from a service network; and
    a controller, receiving a paging message comprising a timer update flag from the service network via the wireless transceiver, transmitting a Service Request message to the service network via the wireless transceiver in response to the paging message comprising the timer update flag, and receiving a downlink (DL) Information Transfer message comprising a value for a periodic update timer from the service network via the wireless transceiver,
    wherein, when the value is negative, the controller further transmits an uplink (UL) Information Transfer message comprising another value in use for the periodic update timer to the service network via the wireless transceiver, and wherein the periodic update timer is a periodic Location Update (LU) timer.

2. The MTC device of claim 1, wherein, when the value is positive, the controller further reactivates the periodic update timer according to the value and transmits an uplink (UL) Information Transfer message comprising an acknowledgement (ACK) to the service network via the wireless transceiver to confirm receipt of the DL Information Transfer message.

3. The MTC device of claim 2, wherein the periodic update timer is a periodic Location Update (LU) timer, a periodic Routing Area Update (RAU) timer, or a periodic Tracking Area Update (TAU) timer.

4. A method for a Machine Type Communication (MTC) device to configure a periodic update timer, comprising:
    receiving a paging message comprising a timer update flag from a service network;
    transmitting a Service Request message to the service network in response to the paging message comprising the timer update flag; and
    receiving a downlink (DL) Information Transfer message comprising a value for a periodic update timer from the service network,
    wherein, when the value is negative, transmitting an uplink (UL) Information Transfer message comprising another value in use for the periodic update timer to the service network, wherein the periodic update timer is a periodic Location Update (LU) timer.

5. The method of claim 4, further comprising:
    when the value is positive, reactivating the periodic update timer according to the value and transmitting an uplink (UL) Information Transfer message comprising an acknowledgement (ACK) to the service network to confirm receipt of the DL Information Transfer message.

6. The method of claim 5, wherein the periodic update timer is a periodic Location Update (LU) timer, a periodic Routing Area Update (RAU) timer, or a periodic Tracking Area Update (TAU) timer.

7. A service network, comprising:
    an access network, comprising at least one base station for performing wireless transmission and reception to and from a Machine Type Communication (MTC) device; and
    a core network, transmitting a paging message comprising a timer update flag to the MTC device via the access network, receiving a Service Request message from the MTC device via the access network, and transmitting a downlink (DL) Information Transfer message comprising a value for a periodic update timer to the MTC device via the access network in response to the Service Request message,
    wherein the value is negative, and the core network further receives an uplink (UL) Information Transfer message comprising another value for the periodic update timer from the MTC device via the access network, wherein the periodic update timer is a periodic Location Update (LU) timer.

8. The service network of claim 7, wherein the value is positive, so that the MTC device reactivates the periodic update timer according to the value, and the core network further receives an uplink (UL) Information Transfer message comprising an acknowledgement (ACK) from the MTC device via the access network.

9. The service network of claim 8, wherein the periodic update timer is a periodic Location Update (LU) timer, a periodic Routing Area Update (RAU) timer, or a periodic Tracking Area Update (TAU) timer.

10. A method for a service network to configure a periodic update timer, comprising:
    transmitting a paging message comprising a timer update flag to a Machine Type Communication (MTC) device;
    receiving a Service Request message from the MTC device; and
    transmitting a downlink (DL) Information Transfer message comprising a value for a periodic update timer to the MTC device in response to the Service Request message,
    wherein the value is negative, the method further comprising:

receiving an uplink (UL) Information Transfer message comprising another value for the periodic update timer from the MTC device, wherein the periodic update timer is a periodic Location Update (LU) timer.

11. The method of claim 10, wherein the value is positive, so that the MTC device reactivates the periodic update timer according to the value, the method further comprising:

receiving an uplink (UL) Information Transfer message comprising an acknowledgement (ACK) from the MTC device.

12. The method of claim 11, wherein the periodic update timer is a periodic Location Update (LU) timer, a periodic Routing Area Update (RAU) timer, or a periodic Tracking Area Update (TAU) timer.

* * * * *